Aug. 12, 1947.  H. P. FINLEY  2,425,610
MOLD RACK
Filed Jan. 16, 1945  2 Sheets-Sheet 1

Inventor
HUGH P. FINLEY
By Rule and Hoge
Attorneys

Aug. 12, 1947.    H. P. FINLEY    2,425,610
MOLD RACK
Filed Jan. 16, 1945    2 Sheets-Sheet 2

Inventor
HUGH P. FINLEY
By Rule and Hoge
Attorneys

Patented Aug. 12, 1947

2,425,610

UNITED STATES PATENT OFFICE 2,425,610

MOLD RACK

Hugh P. Finley, Berlin, N. J., assignor to Owens-Illinois Glass Company, a corporation of Ohio Application January 16, 1945, Serial No. 573,057

5 Claims. (Cl. 18—5)

My invention relates to molds or forms in which material is molded and hardened, and racks for supporting the forms during the induration of the material. In its preferred form the invention provides molds with open ends in combination with a supporting rack for the molds, the rack having end closing plates to form the end walls for the molds.

An object of the invention is to provide a molding apparatus comprising an open-ended mold or form having the advantages of simplicity of construction, low cost, ease of handling, elimination of the end walls of the mold, permitting the sides which have the required resiliency to be sprung apart and thereby facilitate stripping the form from the hardened material, and further, by omitting the ends, avoiding the need of any welding operations in making the form or the use of other structural means for uniting the sides and ends of the form.

A further object of the invention is to provide a rack adapted for holding a multiplicity of the open-ended forms and comprising plates arranged to provide end walls for the forms, means being provided by which said plates may be easily and quickly adjusted to the forms.

Other objects of the invention will appear hereinafter.

Referring to the accompanying drawings which illustrate a preferred form of the invention:

Figure 1:
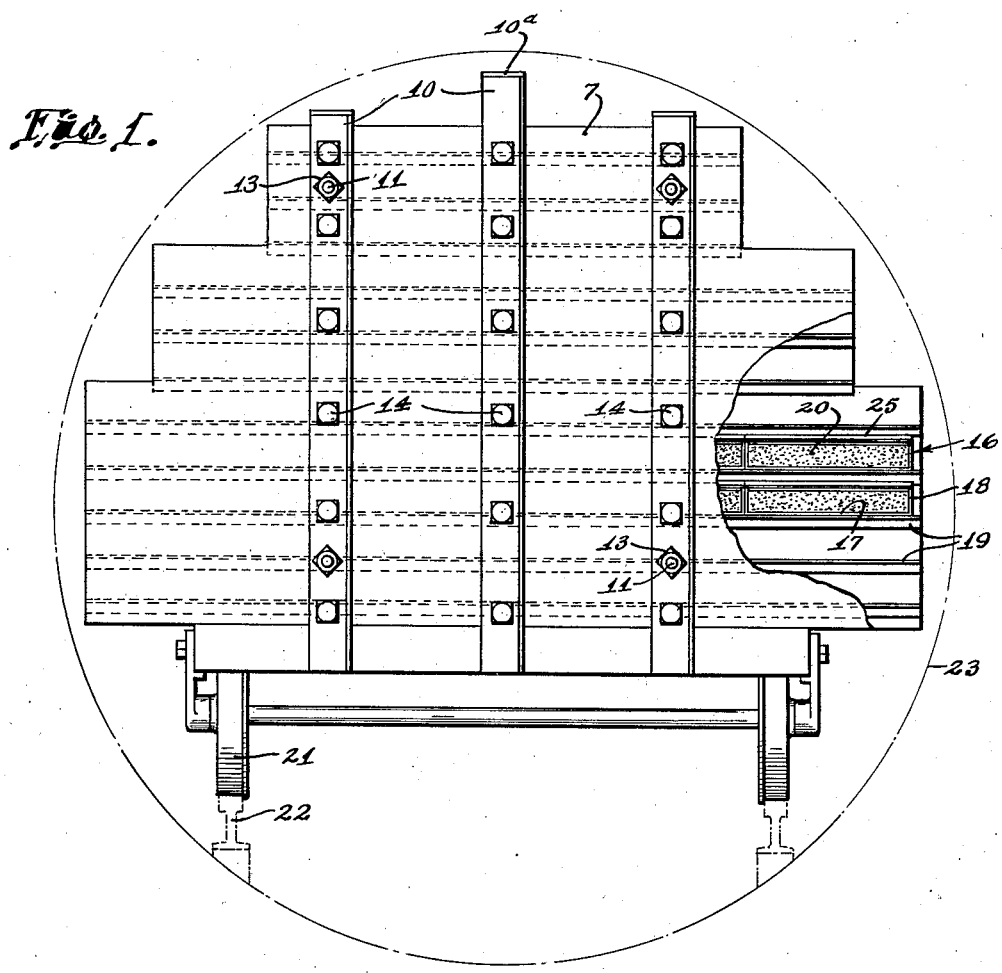
Fig. 1 is an end elevation with parts broken away, of a rack loaded with forms.

The rack which may be made of steel or other suitable metal comprises a base 5 and a pair of parallel, vertical end plates 6 and 7 adapted to provide end walls for the molds or forms as hereinafter set forth. Vertical angle bars 8 welded or otherwise rigidly secured at their lower ends to the base 5 at one end thereof, provide supports for the plate 6 which is fixed thereto. Vertical angle bars 10 at the opposite end of the base 5 and rigidly attached thereto as by welding or the like, provide a support for the plate 7 which has a floating connection therewith and is adjustable toward and from the plate 6. The framework includes crossbars 10ª welded to the upper ends of the uprights 8 and 10.

Figure 2:
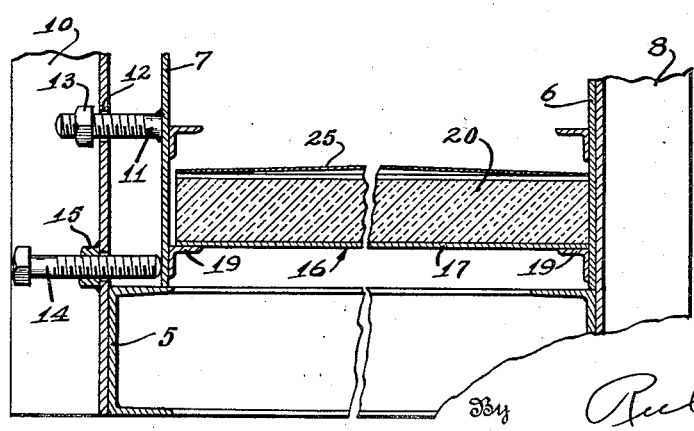
Fig. 2 is a fragmentary cross-sectional elevation on a larger scale of a lower portion of the rack with a form loaded thereon.
Figure 3:
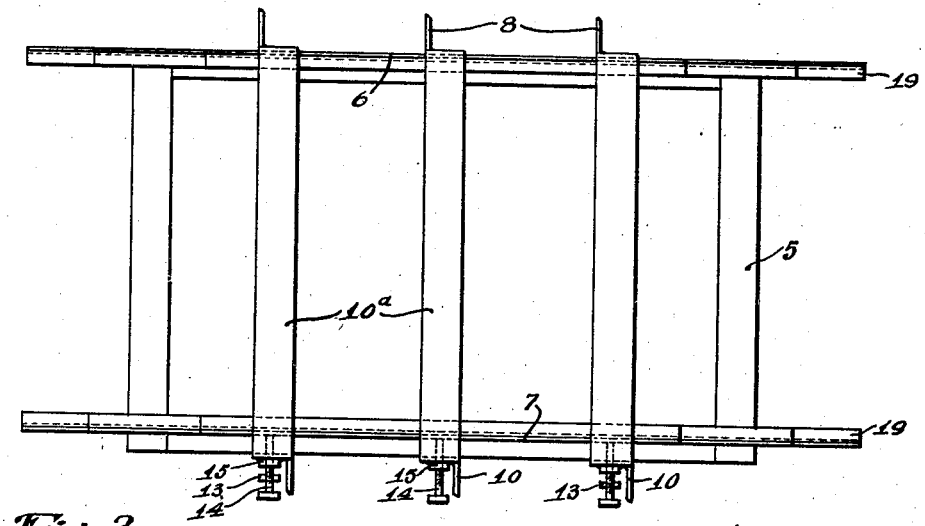
Fig. 3 is a plan view of the rack.
Figure 4:
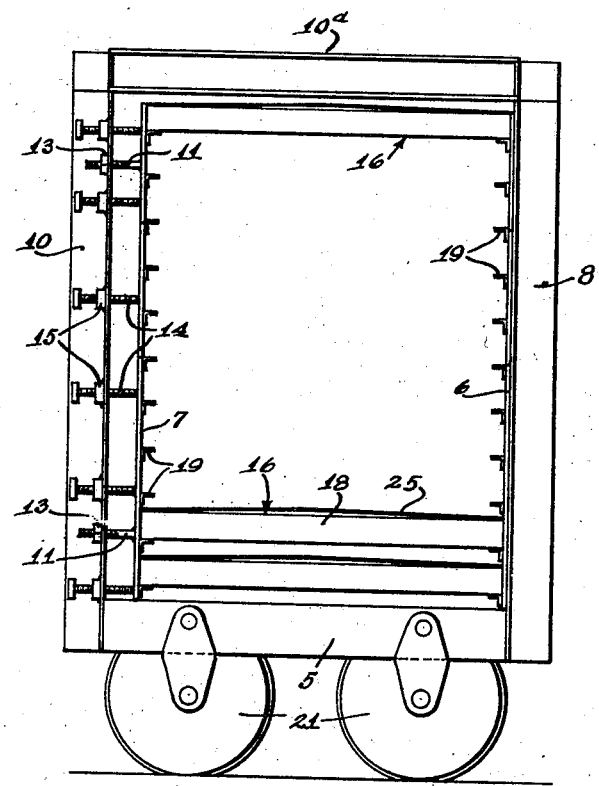
Fig. 4 is a side elevation of the rack, partly loaded.

Bolts 11 welded to the floating plate 7 adjacent the corners thereof, extend loosely through openings 12 (Fig. 2) in the angle bars 10 and are provided with nuts 13 which adjustably limit inward movement of the plate 7. Tightening bolts 14 are threaded through nuts 15 welded to the angle bars 10 and serve for tightening and holding the end plate 7 against the molds 16.

The molds or forms 16 which may be made of sheet steel or other suitable material, are herein shown as open-ended pans, each including a flat bottom 17 and integral side walls 18 bent upwardly therefrom, the ends of the form being left open. Horizontal angle bars or strips 19 are attached to the inner faces of the plates 6 and 7 and serve as slide rails on which the forms 16 are slid into position and supported in the rack.

The molds or forms 16 are adapted to be filled with slurry or other moldable material while in a soft or semi-liquid condition, the material being thereafter hardened while in the molds. As indicated in Fig. 1, the forms 16 are arranged in tiers with a number of forms in each tier.

In operation the lowermost row of forms 16 is placed in position on the supporting strips 19. The floating end plate 7 may then be adjusted close to but not pressing against the molds. The molding material 20 is then poured into the molds. The remaining tiers of molds are then slid into position in succession on the slide rails 19 and are filled in like manner. The floating plate 7 may then be tightened against the molds by the bolts 14. The rack is provided with wheels 21 running on tracks 22 on which the rack is rolled into a conditioning chamber or tunnel 23 where the material is heat-treated as by means of steam and the molding material thereby hardened. The rack is then withdrawn from the tunnel, the tightening bolts 14 retracted to free the floating plate 7, permitting the forms 16 to be removed. The slabs of molded material may then be readily removed from the forms, the resiliency of the side walls 18 facilitating such removal. Cover plates or shields 25 (Fig. 2) placed over the molds protect the material while being treated in the conditioning chamber 23. The shields are particularly adapted to prevent steam condensation from dripping into the molds.

Modifications may be resorted to within the spirit and scope of my invention.

I claim:

1. The combination of a rack comprising parallel-spaced vertical plates, horizontal slide strips attached to the inner faces of said plates with the strips on each plate paired with those on the other plate and vertically spaced for supporting mold forms in tiers, and open-ended mold forms supported on said strips and free for horizontal sliding movement thereon in a direction parallel with the face plates, said plates being positioned to form closures for the open ends of the mold forms, one of said plates being floatingly mounted and adjustable toward and from the molds while the latter are supported on said strips.

2. The combination of a rack comprising parallel-spaced vertical plates, horizontal slide strips attached to the inner faces of said plates with the strips on each plate paired with those on the other plate and vertically spaced for supporting mold forms in tiers, and open-ended mold forms slidably supported on said strips, said plates being positioned to form closures for the open ends of the mold forms, said rack comprising vertical supporting bars spaced outwardly from one of said plates, means providing a floating connection of the latter with said bars, said means including bolts attached to the floating plate and extending loosely through openings formed in the said supporting bars, and tightening bolts having a screw-threaded connection with said supporting bars and positioned to bear against the exterior face of the said floating plate for clamping the latter against said mold forms.

3. Molding apparatus comprising a rack and open-ended forms removably supported therein, said forms each consisting of an imperforate bottom and imperforate side walls rising therefrom, said rack comprising vertical parallel end plates in position to form closures for the open ends of the forms when the latter are placed on the rack, means connected to said end plates and cooperating therewith to form a slideway on which the forms are slidable into and out of the rack, and means for adjusting one of said end plates toward and from the other to a position in which the end plates grip the forms and close said ends thereof while on the slideway and to another position in which the end plates are close to the ends of the forms and provide closures therefor while the forms are free for said slidable movement, and means for securing said adjustable plate in said positions of adjustment.

4. The combination of a rack comprising parallel spaced vertical plates, a base to which the plates are attached, horizontal slide strips attached to the inner faces of said plates with the strips on each plate paired with those on the other plate and vertically spaced for supporting mold forms in tiers, open-ended mold forms each consisting of an imperforate bottom and imperforate side walls rising therefrom, said mold forms being supported on said strips and free for horizontal sliding movement thereon in a direction parallel with the said plates, said plates being positioned to form closures for the open ends of the mold forms with the latter in sliding contact with plates, means for adjusting one said plate toward the other to one position in which it bears against the mold forms and clamps them between the said plates, and to another position in which the mold forms are free for sliding movement between the plates and in which latter position, said plates substantially close the open ends of the mold forms, and means for securing said adjustable plate in said positions of adjustment.

5. Molding apparatus comprising a rack and open-ended mold forms, said rack comprising a horizontal base, a pair of parallel spaced vertical plates mounted over the base, means rigidly attaching one said plate to the base, means for adjusting the other plate bodily toward and from the first plate to different positions of adjustment, means for locking the adjustable plate in any said position of adjustment, and oppositely disposed parallel slide strips attached to the inner faces of said plates, said mold forms being slidably supported on said strips for horizontal movement thereon, said plates, while the movable plate is locked in one said position, being close to and forming closures for said ends while the mold forms slide on said strips.

HUGH P. FINLEY.

REFERENCES CITED

The following references are of record in the file of this patent:

UNITED STATES PATENTS

| Number | Name | Date |
|---|---|---|
| 2,180,304 | Minor | Nov. 14, 1939 |
| 1,184,117 | Morley et al. | May 23, 1916 |
| 1,440,105 | Roiderer | Dec. 26, 1922 |
| 1,481,948 | Zagelmeyer | Jan. 29, 1924 |
| 1,348,775 | Bellonby | Aug. 3, 1920 |
| 281,057 | Hale | July 10, 1883 |
| 1,228,240 | Pierce | May 29, 1917 |
| 414,458 | Strickler et al. | Nov. 5, 1889 |
| 1,256,241 | McGinnis | Feb. 12, 1918 |